(12) United States Patent
Byler et al.

(10) Patent No.: US 11,400,853 B2
(45) Date of Patent: Aug. 2, 2022

(54) SLEEPER CABS FOR GOOSENECK TRAILERS

(71) Applicants: Darren Byler, Warren, OR (US); Kimberly Riedel-Byler, Warren, OR (US)

(72) Inventors: Darren Byler, Warren, OR (US); Kimberly Riedel-Byler, Warren, OR (US)

(*) Notice: Subject to any disclaimer, the term of this patent is extended or adjusted under 35 U.S.C. 154(b) by 0 days.

(21) Appl. No.: 17/398,217

(22) Filed: Aug. 10, 2021

(65) Prior Publication Data

US 2021/0362640 A1 Nov. 25, 2021

Related U.S. Application Data

(60) Provisional application No. 63/063,722, filed on Aug. 10, 2020.

(51) Int. Cl.
*B60P 3/38* (2006.01)
*B62D 53/08* (2006.01)

(52) U.S. Cl.
CPC ............... *B60P 3/38* (2013.01); *B62D 53/08* (2013.01)

(58) Field of Classification Search
CPC .............. B60P 3/38; B60P 3/36; B62D 53/08
See application file for complete search history.

(56) References Cited

U.S. PATENT DOCUMENTS

| | | | | |
|---|---|---|---|---|
| 3,879,240 A * | 4/1975 | Wall | ......................... | B60P 3/32 156/78 |
| 4,058,133 A * | 11/1977 | Barr | ......................... | B60P 3/38 135/88.17 |
| 4,471,793 A * | 9/1984 | Cattaneo | ................... | B60P 3/38 135/88.16 |
| 5,505,514 A * | 4/1996 | Green | ....................... | B60P 3/36 114/344 |
| 7,278,650 B2 * | 10/2007 | Brady | ....................... | B60P 3/32 280/441.2 |
| 7,618,085 B1 * | 11/2009 | Bean | ........................ | B60P 3/10 296/157 |
| 7,938,427 B2 * | 5/2011 | Ousley | .................... | B60R 1/003 280/433 |
| 8,419,037 B2 * | 4/2013 | Graber | ................. | B62D 53/061 280/433 |
| 9,290,213 B2 * | 3/2016 | Connor | .................. | B62D 31/04 |
| 2009/0134600 A1 * | 5/2009 | Tinley | .................... | B62D 21/20 280/441.2 |
| 2010/0101020 A1 * | 4/2010 | Bisinger | .................. | B60P 3/38 5/118 |
| 2013/0341898 A1 * | 12/2013 | Rhymer | ................ | B62D 21/20 280/789 |
| 2020/0198419 A1 * | 6/2020 | Schultz | .................... | B60D 1/48 |
| 2020/0361359 A1 * | 11/2020 | Jacobs | .................... | B60P 3/105 |

OTHER PUBLICATIONS

White, Angela, "Truck Camper on a Gooseneck", posted on the internet Jun. 13, 2014, all pages.*

* cited by examiner

*Primary Examiner* — Jason S Morrow

(57) ABSTRACT

Sleeper cabs for a gooseneck trailer. The gooseneck trailer includes a horizontal neck portion coupled to a cargo bed of a truck. The sleeper cabs include a base and an enclosure. The base is configured to securely mount to the horizontal neck portion of the gooseneck trailer. The enclosure defines a mobile dwelling supported on the base. In some examples, the sleeper cabs include a ladder to assist with climbing up to or descending from the enclosure.

19 Claims, 6 Drawing Sheets

SLEEPER CABS FOR GOOSENECK TRAILERS

CROSS REFERENCE TO RELATED APPLICATIONS

This application claims priority to U.S. Application, Ser. No. 63/063,722, filed on Aug. 10, 2020, which is hereby incorporated by reference for all purposes.

BACKGROUND

The present disclosure relates generally to sleeper cabs. In particular, sleeper cabs configured to mount to gooseneck trailers are described.

Hot shot trucking is an important component of the trucking industry utilizing pickup trucks instead of semitrucks to haul loads on trailers. Hot shot truck drivers often utilize gooseneck trailers to haul loads with their pickup trucks. Gooseneck trailers are configured to couple to the box or bed of a pickup truck with a ball hitch attached to a "neck" of the trailer. The neck of the gooseneck trailer extends over the box or bed of the pickup truck.

Hot shot truck drivers often carry smaller, more time-sensitive loads than semitruck drivers. Like semitruck drivers, hot shot truck drivers often have to haul loads considerable distances over multiple days. Also like semitruck drivers, hot shot truck drivers are subject to various laws and regulations mandating breaks and sleep schedules.

Unlike semitrucks, however, pickup trucks used in hot shot trucking are not large enough to accommodate a sleeper cab. The lack of a sleeper cab can force hot shot truck drivers to rent expensive hotel rooms to comply with sleep schedule regulations and to allow them to sleep effectively. Lacking a place to sleep in one's truck also reduces the driver's route flexibility as hotel rooms may not be available at convenient or required stopping locations.

While certain pickup trucks are large enough for an average size adult to lay down to some extent, these pickup trucks do not provide an adequate sleeping solution. Even the largest pickup trucks available on the market are too small to allow a driver to fully stretch out and sleep comfortably. Seats designed for sitting are inadequate as mattresses. Importantly, sleeping in a pickup truck does not satisfy laws and regulations mandating sleep breaks. Thus, even if it is possible to sleep uncomfortably in a pickup truck, doing so will not allow a driver to satisfy his or her sleep requirements under the laws governing truck drivers.

It would be desirable for hot shot truck drivers to have a way to sleep on their routes without having to rent a hotel room. It would be further advantageous if the truck drivers could sleep at roadside locations, such as rest stops, shoulders of a road, or parking lots wherever and whenever such locations were convenient. Further, it would be desirable if hot shot truck drivers could satisfy laws and regulations governing sleep schedules easily and conveniently when on their routes with their vehicles and trailers. Moreover, it would be preferable to provide a sleeper cab solution that did not require modifying the pickup truck since modifications make the pickup truck less desirable to use for private applications outside of hot shot trucking jobs.

Examples of new and useful sleeper cabs for gooseneck trailers relevant to the needs existing in the field of hot shot trucking are discussed below.

SUMMARY

The present disclosure is directed to sleeper cabs for a gooseneck trailer. The gooseneck trailer includes a horizontal neck portion coupled to a cargo bed of a truck. The sleeper cabs include a base and an enclosure. The base is configured to securely mount to the horizontal neck portion of the gooseneck trailer. The enclosure defines a mobile dwelling supported on the base. In some examples, the sleeper cabs include a ladder to assist with climbing up to or descending from the enclosure.

DETAILED DESCRIPTION

Figure 1:
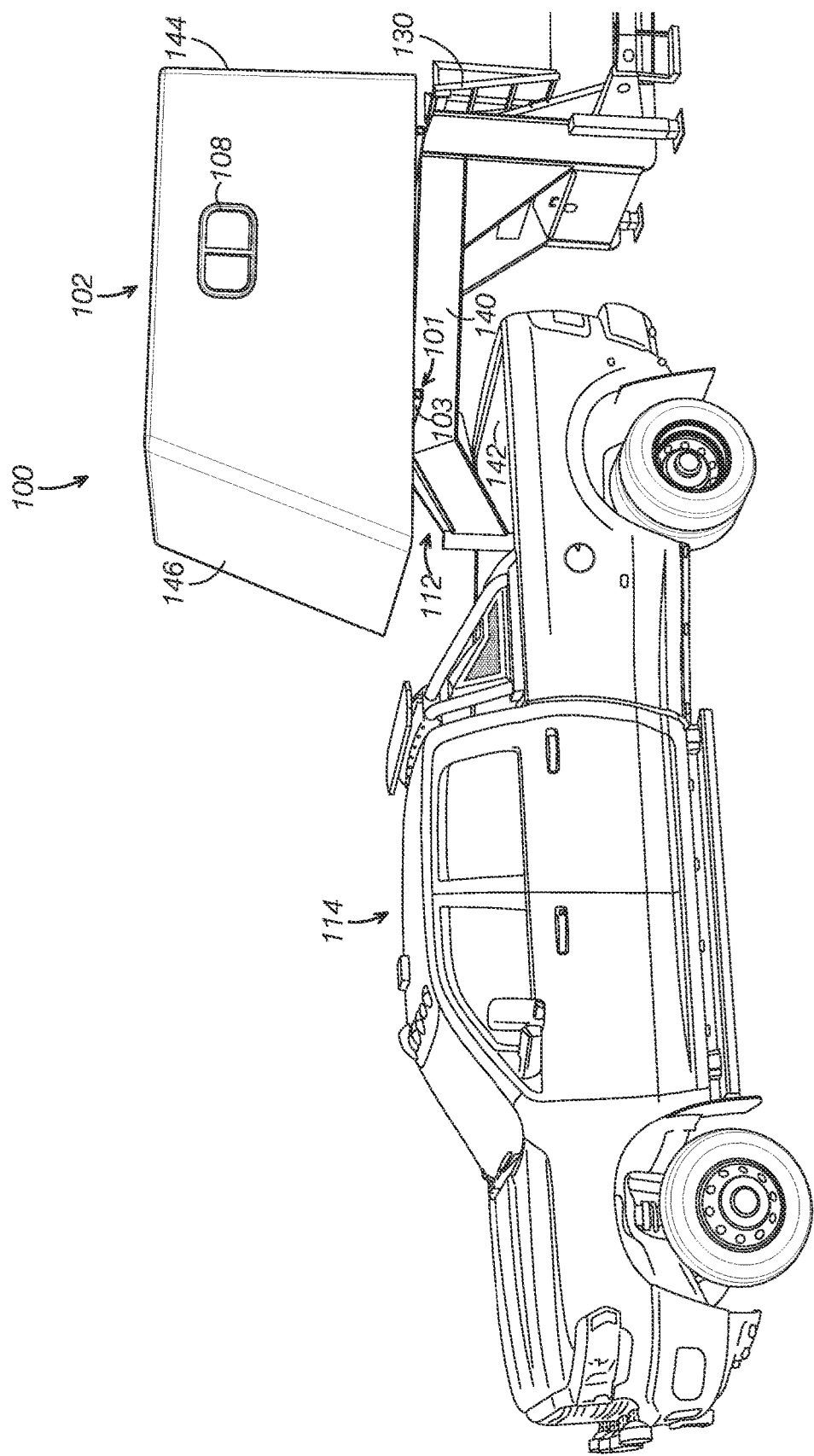
FIG. 1 is a perspective view of a sleeper cab mounted on a gooseneck trailer coupled to a truck.
Figure 2:
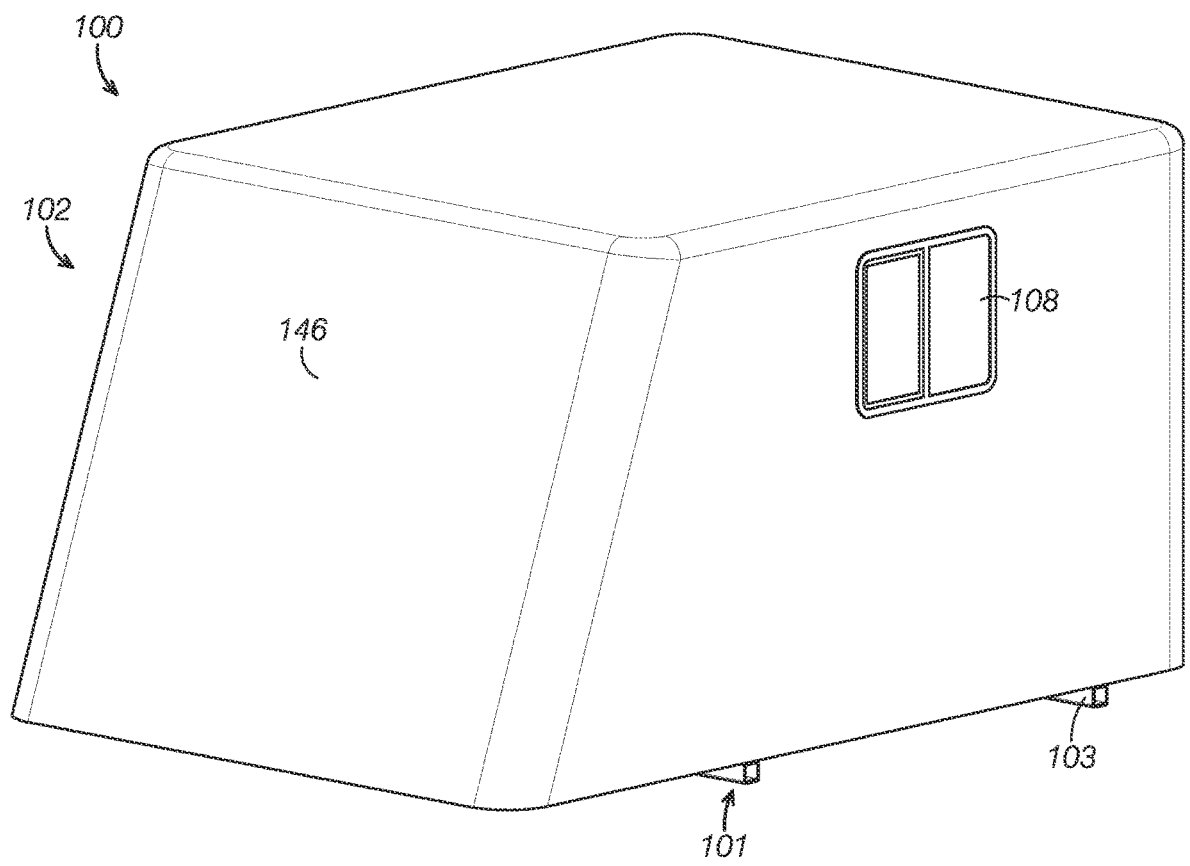
FIG. 2 is a front perspective view of the sleeper cab shown in FIG. 1.

The disclosed sleeper cabs will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various sleeper cabs are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Sleeper Cabs for Gooseneck Trailers

With reference to the figures, sleeper cabs for gooseneck trailers will now be described. The sleeper cabs discussed herein function to provide hot shot truck drivers a place to sleep comfortably and in compliance with sleep regulations wherever they wish to stop driving when pulling their trailers.

The reader will appreciate from the figures and description below that the presently disclosed sleeper cabs address many of the challenges facing hot shot truck drivers. For example, the sleeper cabs discussed herein avoid hot shot truck drivers having to rent expensive hotel rooms to comply with sleep schedule regulations and to sleep effectively. Having a sleeper cab on a trailer increases a driver's route flexibility because he or she is not limited to routes with hotel rooms available at convenient or required stopping locations.

The sleeper cabs discussed in this document are substantially superior for sleeping than cabs of conventional pickup trucks. Back seats of pickup trucks are too small to allow a driver to fully stretch out and sleep comfortably. Unlike seats designed for sitting, which are inadequate as mattresses, the presently described sleeper cabs accommodate full length sleeping berths with dedicated mattresses for sleeping. Importantly, sleeping in the sleeper cabs disclosed herein satisfy laws and regulations mandating sleep breaks for truck drivers unlike sleeping in a pickup truck.

The reader will appreciate that the sleeper cabs discussed in this document provide hot shot truck drivers a way to sleep on their routes without having to rent a hotel room. The sleeper cabs further allow truck drivers to sleep at roadside locations, such as rest stops, shoulders of a road, or parking lots wherever and whenever such locations are convenient. With the sleeper cabs discussed in this document, hot shot truck drivers can satisfy laws and regulations governing sleep schedules easily and conveniently when on their routes with their vehicles and trailers. Advantageously, the sleeper cabs disclosed herein do not require modifying the driver's pickup truck, which avoids interfering with the pickup truck's use for private applications outside of hot shot trucking jobs.

Contextual Details

Ancillary features relevant to the sleeper cabs disclosed herein will first be described to provide context and to aid the discussion of the sleeper cabs.

Gooseneck Trailer

Figure 6:
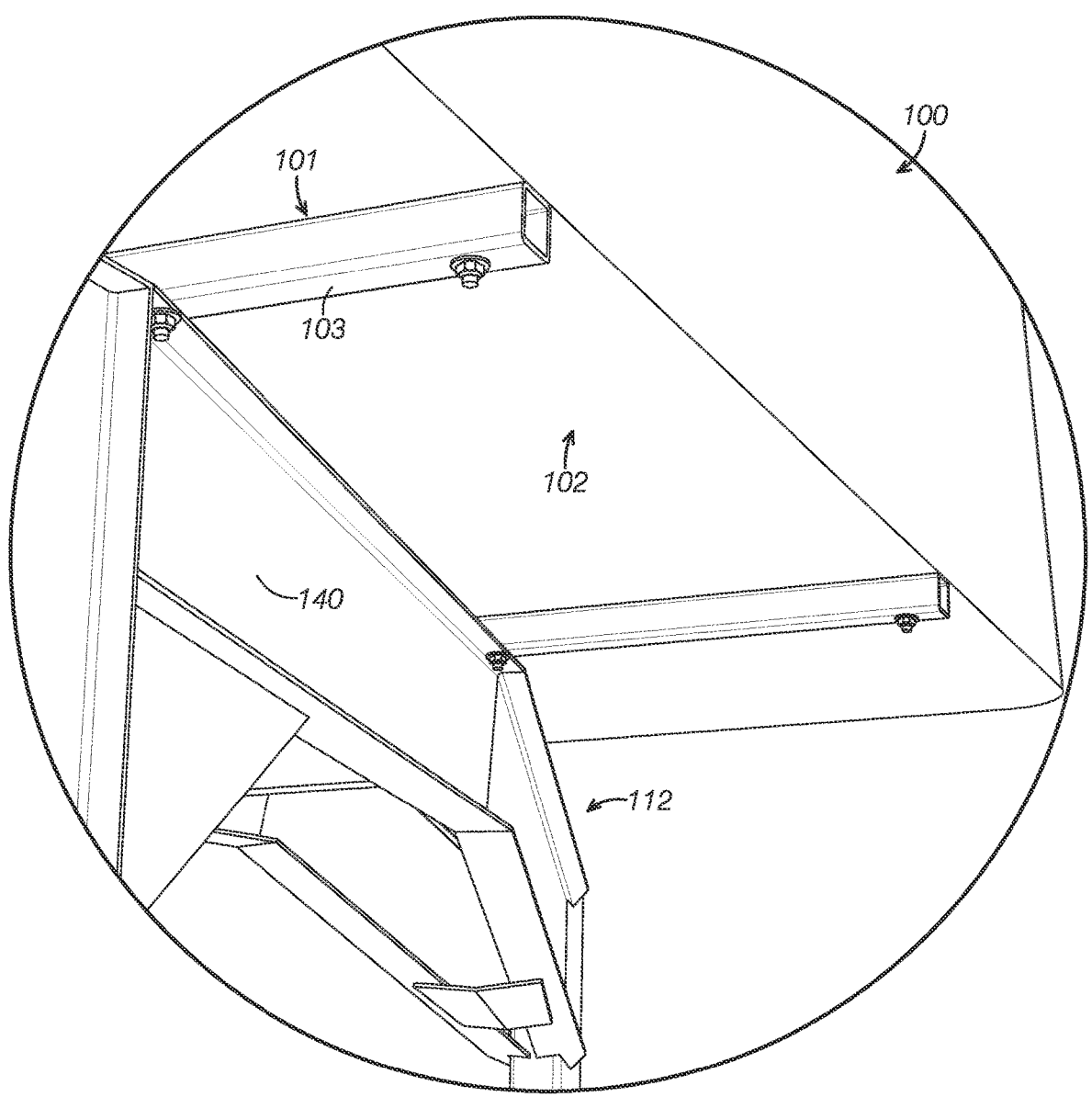
FIG. 6 is a close up view of a portion of the sleeper cab and the gooseneck trailer depicting a bolt securing a beam of the sleeper cab to the gooseneck trailer.

The sleeper cabs described below are configured to mount to gooseneck trailers. One example of a gooseneck trailer, gooseneck trailer 112, is shown in FIGS. 1 and 6. As shown in FIG. 1, gooseneck trailer 112 is coupled to a pickup truck 114.

The reader can see in FIGS. 1 and 6 that gooseneck trailer 112 includes a horizontal neck portion 140. Horizontal neck portion 140 is coupled to a cargo bed 142 of pickup truck 114. The sleeper cabs discussed below may effectively mount to gooseneck trailers configured differently than gooseneck trailer 112 shown in FIG. 1.

Truck

The sleeper cabs discussed herein mount to gooseneck trailers pulled by trucks. One example of a suitable truck, pickup truck 114, is depicted in FIG. 1. The truck may be any currently known or later developed type of truck. More broadly, the sleeper cabs described in this document may be used with any vehicle suitable for pulling a gooseneck trailer.

Sleeper Cab Embodiment One

With reference to FIGS. 1-6, a first example of a sleeper cab, sleeper cab 100, will now be described. Sleeper cab 100 is mounted to a gooseneck trailer 112 coupled to a pickup truck 114. Sleeper cab 100 includes a base 101, an enclosure 102, a door 106, a ladder 130, and windows 108. The sleeper cab may include a variety of additional, optional components, such as a bed, interior lights, a climate control system, a table, a chair, and an entertainment system.

In some examples, the sleeper cab does not include one or more features included in sleeper cab 100. For example, some sleeper cab examples do not include a base, windows, or a sleeping berth. In other examples, the sleeper cab includes additional or alternative features, such as a pop-up roof mechanism, an audio-video receiver, interior lights, a climate control system, a table, a chair, an entertainment system, a ramp or stairs, and features for personal convenience, such as a toilet.

The sleeper cab may be any combination of dimensions that can be installed on a gooseneck trailer. The dimensions may, but are not required to, comply with regulations and laws governing road and transportation dimensions. For example, reflecting currently applicable regulations, the sleeper cab may be any structure that has a width of 8.5 feet or less, a length of 12 feet or less, and a height of 14 feet or less.

Base

Base 101 functions to support enclosure 102 and other components of sleeper cab 100. Base 101 also functions to couple sleeper cab 100 to trailer 112.

As shown in FIGS. 1-4 and 6, base 101 includes laterally extending beams 103 disposed between enclosure 102 and horizontal neck portion 140 of trailer 112. Beams 103 extend beyond the width of horizontal neck portion 140 of the gooseneck trailer.

In the example shown in FIGS. 1-6, enclosure 102 is mechanically fastened to base 101 and base 101 is mechanically fastened to horizontal neck portion 140. However, the base is an optional feature not present in all examples. In some examples, the enclosure is secured to the horizontal neck portion of the gooseneck trailer directly and the sleeper cab does not include a base. For example, the enclosure may be mechanically fastened to the horizontal neck portion with bolts.

In the example shown in FIGS. 1-6, beams 103 mechanically couple to horizontal neck portion 140 of gooseneck trailer 112. In the present example, as shown in FIG. 6, beams 103 bolt onto horizontal neck portion 140 of gooseneck trailer 112. Base 101 may be selectively removed from gooseneck trailer 112 by unbolting beams 103 from horizontal neck portion 140.

As shown in FIG. 6, base 101 also bolts to enclosure 102. Additionally or alternatively to bolting, the base may secure to trailers and/or to the enclosure in any currently known or later developed manner, such as via other mechanical fasteners, welding, adhesives, or magnetic couplers.

In the example shown in FIGS. 1-6, beams 103 are made of metal, but may be made of other materials, such as wood or polymers. The beams may be any material currently known or later developed suitable for supporting and coupling the frame to the trailer.

Enclosure

Enclosure 102 functions to support components of sleeper cab 100 and to define an interior space for sleeping and relaxing. Expressed another way, enclosure 102 defines a mobile dwelling supported on base 101. As shown in FIGS. 1-4 and 6, enclosure 102 rests on and couples to base 101.

As can be seen in FIGS. 1-4, enclosure 102 defines a substantially rectangular profile with an aerodynamic slanted leading wall 146. In the present example, leading wall 146 extends beyond the length of horizontal neck portion 140. As shown in FIGS. 1-4, enclosure 1-2 includes a trailing wall 144 disposed distal the direction of travel of truck pickup truck 114. In the example shown in FIGS. 1-6, enclosure 102 has an aerodynamic outer profile.

Figure 5:
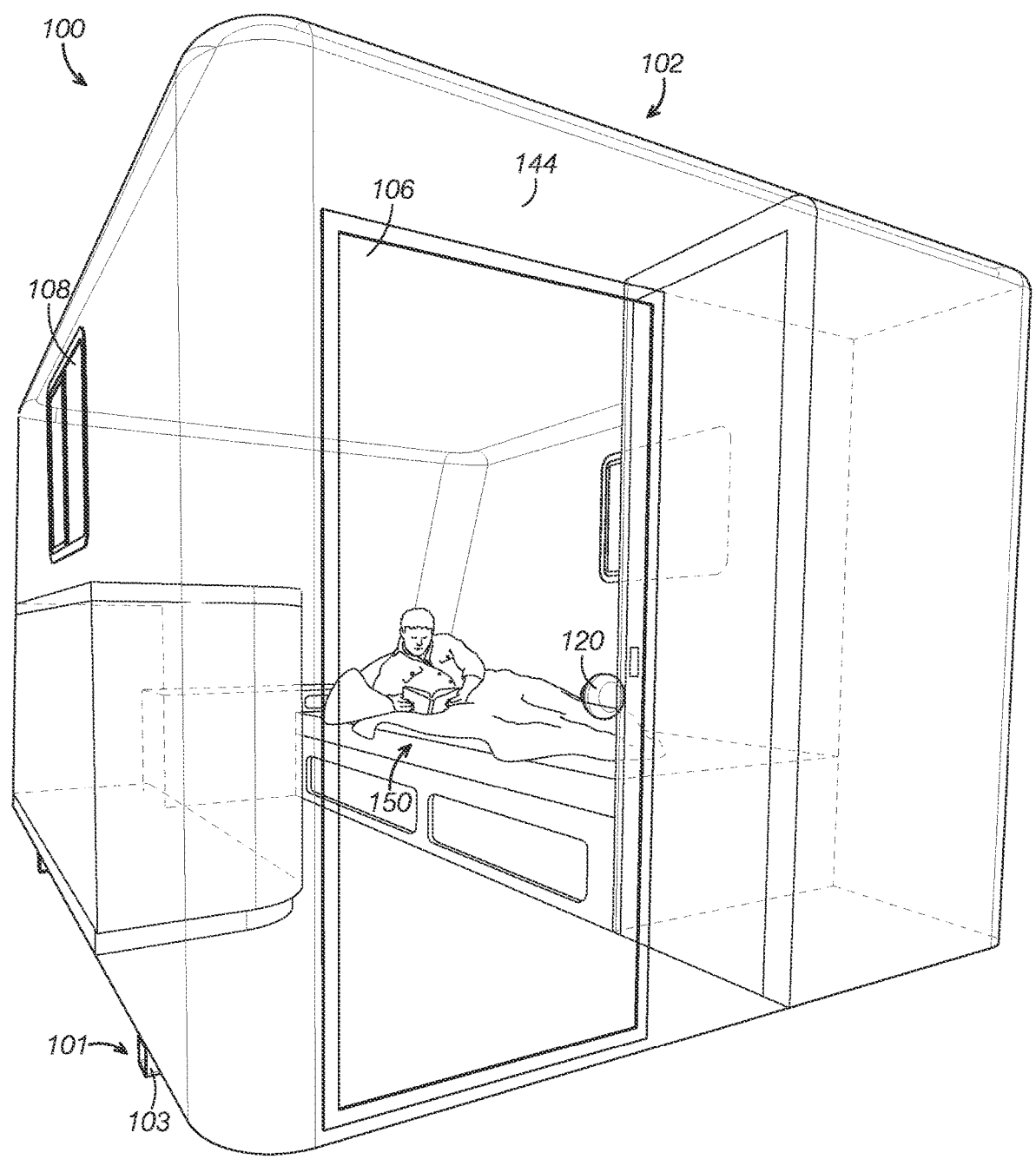
FIG. 5 is a view of an interior of the sleeper cab depicting a sleeping berth.

The enclosure may be any shape and have any footprint dimensions suitable for given application and to satisfy applicable laws and regulations. In the present example, enclosure 102 does not exceed 14 feet in height to stay within regulations prohibiting height dimensions exceeding 14 feet. As shown in FIG. 5, enclosure 102 defines an interior space that accommodates a sleeping berth 150 of at least 75 inches to comply with regulations requiring sleeping berth dimensions of at least 75 inches.

In some examples, the enclosure includes a pop-up roof mechanism to selectively increase the height of the enclosure. Selectively increasing the height of the enclosure may be desirable to enable standing within the sleeper cab or to provide more head space. Any conventional or later developed pop-up roof mechanism may be used, such as those commonly used in recreational vehicles and trailers.

In some examples, the enclosure includes a vent for ventilation. The optional vent may be disposed in the roof of the enclosure, in the floor of the enclosure, or in one or more of the sidewalls. The vent may be any suitable size and shape and may be any currently known or later developed type of vent.

In the present example, enclosure 102 is molded into a desired shape. In particular, enclosure 102 is comprised of a fiberglass shell with a foam core disposed between the walls of the fiberglass shell. Construction techniques used to manufacture fiberglass boats have been adapted to manufacture molded frames as described herein. The molded frame enclosure shown in the figures is lighter weight, stiffer, and less expensive to manufacture than many other enclosure types, such as frames formed from structural members fastened together.

In some examples, the enclosure defines a frame of structural members with sheeting covering the structural members. The frame may be comprised of wood beam structural members fastened together to forms walls, a floor, and a roof. In other examples, aluminum beams are used for the structural members. In frame examples that use beams, the beams may be formed from any currently known or later developed structural material and may be fastened together by any currently known or later developed means.

In structural member frame examples of the enclosure, the sheeting functions to cover the structural member frame and to protect the interior of enclosure from the elements. The sheeting is formed from fiberglass in certain examples. In other example, other materials are used for the sheeting, such as wood, metal, and polymers. The sheeting may be any currently known or later developed covering material.

Door

Door 106 enables ingress into sleeper cab 100 and egress out of sleeper cab 100. The door may be any form, type, or style of door currently known or later developed. Any suitable material may be used, such as wood and metal.

Figure 3:
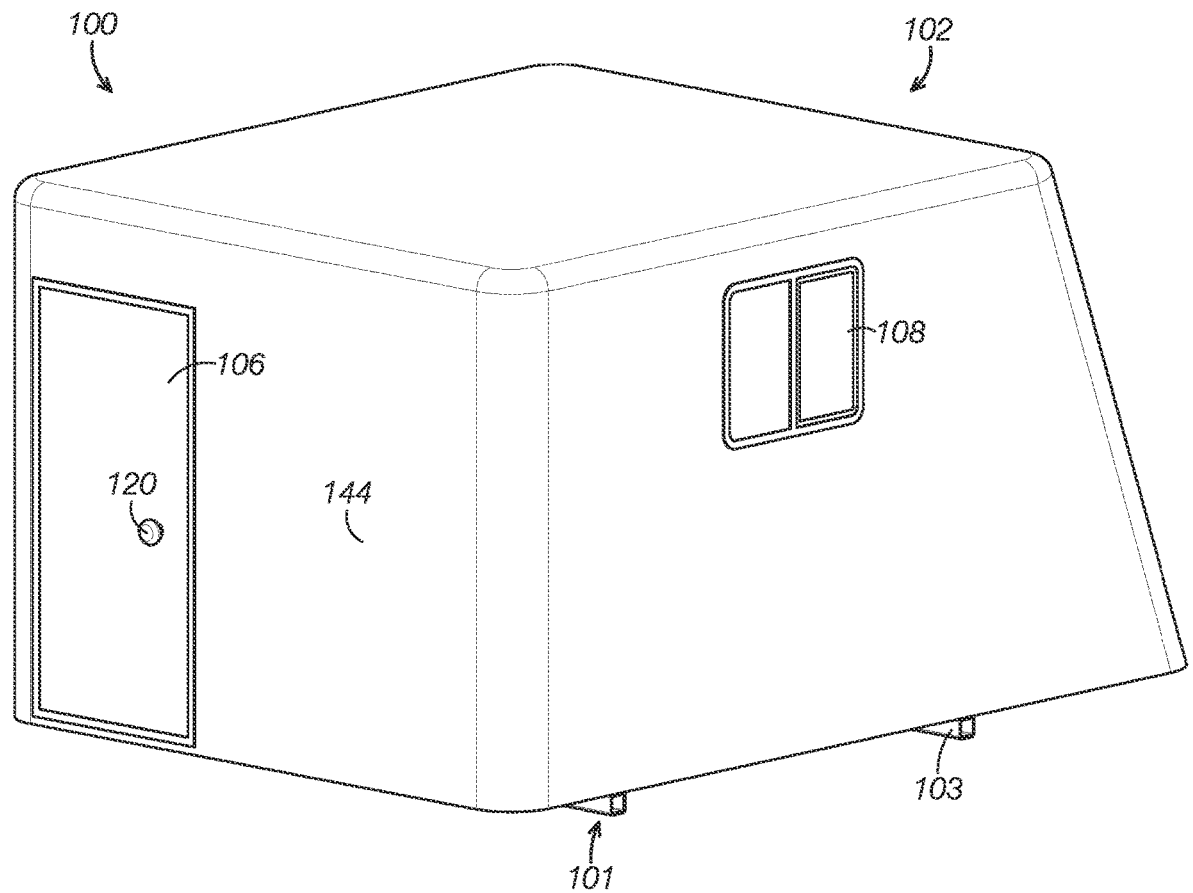
FIG. 3 is a rear perspective view of the sleeper cab shown in FIG. 1.
Figure 4:
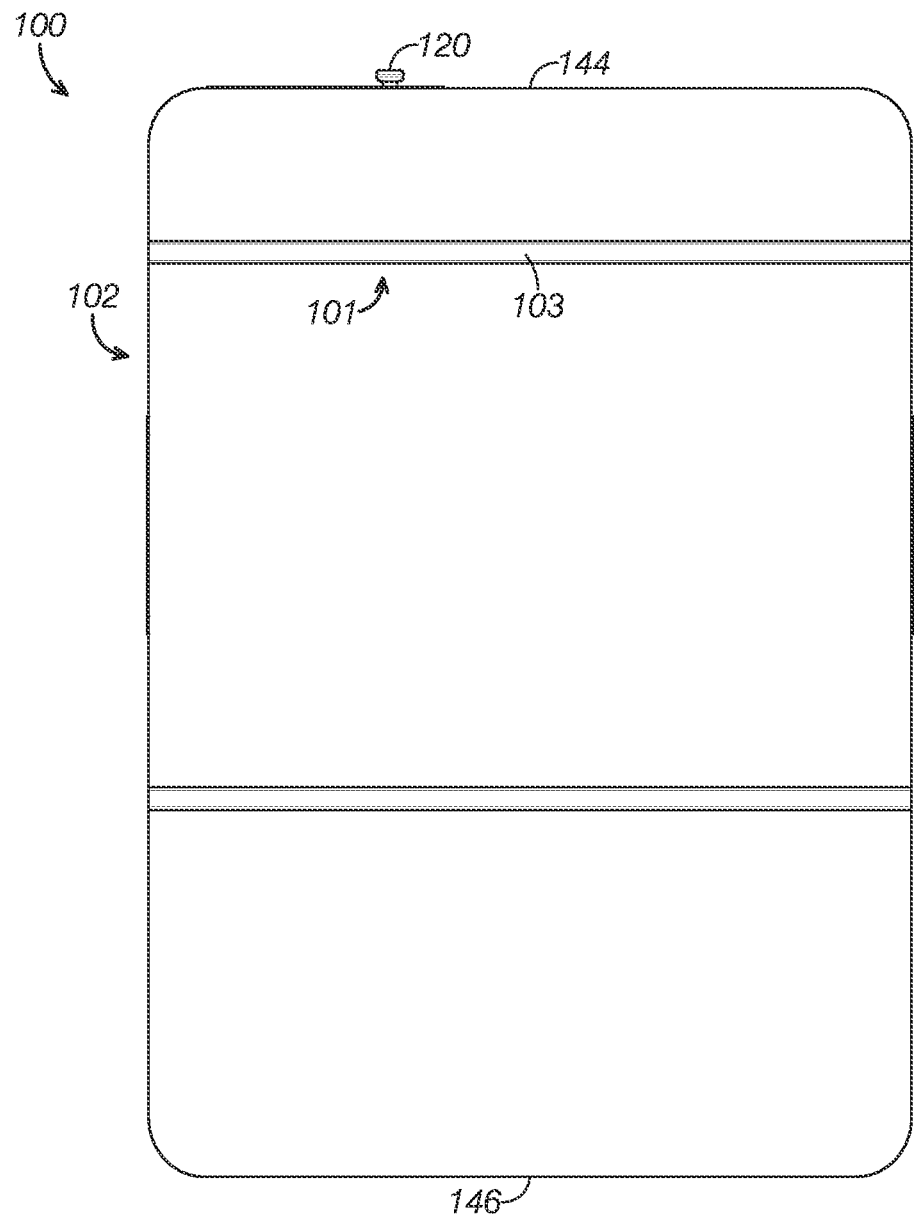
FIG. 4 is a bottom view of the sleeper cab shown in FIG. 1.

The door may include a window, a handle, and/or a locking device. As shown in FIG. 3, door 106 includes a door handle 120. As can be seen in FIG. 3, door 106 is disposed on trailing wall 144 of enclosure 102. However, the door may be disposed on any of the vertical walls of the enclosure, including the two side walls. In examples where the leading wall is vertical instead of slanted, the door may be disposed on the leading wall as well.

In some examples, the door includes a door handle in a relatively low position. The relatively low position enables a user to reach the door handle from a position beneath the sleeper cab. For example, a user will often seek to enter the sleeper cab from a position below the sleeper cab when standing next to the neck of the gooseneck trailer.

Ladder 130 functions to assist a person reaching door 106 and entering and exiting enclosure 102. The reader can see in FIG. 3 that ladder 130 ladder is positioned proximate to door 106 to assist a person reaching door 106.

Additionally or alternatively to a ladder, the sleeper cab may include stairs or a ramp to assist a person reaching the door. Any currently known or later developed style or type of stairs, ramp, or ladder may be used.

The stairs, ramp, and/or ladder may be fixed to the sleeper cab or to the trailer in a fixed position. In some examples, the stairs, ramp, and/or ladder are not attached to the sleeper cab or to the trailer. In some examples, as shown in FIG. 1, the stairs, ramp, and/or ladder may be selectively configured between in-use and stowed configurations.

Window

Windows 108 serve to provide light into sleeper cab 100, to allow occupants to see out of sleeper cab 100, and, in some examples, to ventilate sleeper cab 100. The windows may be any conventional or newly developed style of window. The size and shape of the windows and window openings may be different than the size and shape of windows 108 and the window openings depicted in FIGS. 1-5.

Window openings for windows 108 are defined by enclosure 102. In the present example where enclosure 102 is a molded frame, the window openings are cut out of the molded walls of enclosure 102. As shown in FIGS. 1-4, windows 108 are mounted to frame 102 in the window openings.

In some examples, the windows selectively open and in other examples they are fixed panes that do not open. In examples where the windows open, the windows may include a screen.

In the example shown in FIGS. 1-5, sleeper cab 100 includes two windows located on opposite lateral sides of enclosure 102. Other sleeper cab examples may include additional windows, fewer windows, or no windows.

Additional Components

The sleeper cabs discussed herein may include a wide variety of additional components for user comfort and/or to facilitate sleeping. For example, the sleeper cabs may include interior lights, a climate control system, a table, a chair, and an entertainment system among a wide variety of other potential components. The sleeper cabs may include any additional or alternative components useful and/or customary for enclosed living or sleeping quarters.

An audio-video receiver is one example of an optional component that may be included in the sleeper cabs described herein. The audio-video receiver enables audio-visual content transmitted from satellites and terrestrial transmitters to be received and processed for presentation on audio-video equipment. The audio-video receiver is an optional component that may be included for user entertainment and/or communication. The audio-video receiver may be any currently known or later developed style or type of audio-video receiver, including satellite signal receivers, over-the-air antennas, modems, cable television receivers, and the like.

Gooseneck Trailer Sleeper Cab System

In some examples, the sleeper cab is combined with the gooseneck trailer to define a gooseneck trailer sleeper cab system. In certain gooseneck trailer sleeper cab system examples, the sleeper cab is fixedly coupled to the gooseneck trailer, such as by welding the base to the gooseneck trailer. In other system examples, the sleeper cab is removably coupled to the gooseneck trailer.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A sleeper cab in combination with a gooseneck trailer including a horizontal neck portion and a trailer bed coupled to the horizontal neck portion, the gooseneck trailer coupled to a cargo bed of a truck, the sleeper cab comprising:
   an enclosure configured for a person to reside within the enclosure and operatively secured exclusively to the horizontal neck portion;
   wherein the enclosure includes a trailing end disposed distal the direction of travel of the truck;
   wherein the trailing end is disposed proximate the horizontal neck portion and leaves the trailer bed unobstructed by the enclosure.

2. The sleeper cab of claim 1, wherein:
   the sleeper cab further comprises a base configured to securely mount to the horizontal neck portion of the gooseneck trailer; and
   the enclosure is mounted to the base.

3. The sleeper cab of claim 2, wherein the base includes beams extending across the horizontal neck portion of the gooseneck trailer.

4. The sleeper cab of claim 3, wherein the beams extend beyond the width of the horizontal neck portion of the gooseneck trailer.

5. The sleeper cab of claim 2, wherein:
   the beams are mechanically fastened to the horizontal neck portion of the gooseneck trailer; and
   the enclosure is mechanically fastened to the beams.

6. The sleeper cab of claim 1, wherein the enclosure includes a door for selective access into the enclosure.

7. The sleeper cab of claim 6, wherein the door includes a doorknob positioned on the lower half of the enclosure to make it more accessible when climbing up to the enclosure operatively supported on the horizontal neck portion of the gooseneck trailer.

8. The sleeper cab of claim 6, wherein:
   the enclosure includes a trailing wall disposed distal the direction of travel of the truck; and
   the door s disposed on the trailing wall.

9. The sleeper cab of claim 1, wherein the enclosure defines an interior space that accommodates a berth for sleeping.

10. The sleeper cab of claim 9, wherein the berth for sleeping is at least 75 inches long to satisfy minimum sleeping berth dimension limits specified in traffic safety regulations.

11. The sleeper cab of chin 9, wherein the enclosure has outside dimensions not exceeding exterior dimension limits specified in traffic safety regulations.

12. The sleeper cab of claim 1, wherein the enclosure has an aerodynamic outer profile.

13. The sleeper cab of claim 12, wherein:
   the enclosure includes a leading wall disposed proximate the direction of travel of the truck; and
   the leading wall is slanted.

14. The sleeper cab of claim 13, wherein the leading wall extends beyond the length of the horizontal neck portion.

15. The sleeper cab of claim 1, wherein the enclosure comprises molded walls defining the interior.

16. The sleeper cab of claim 15, wherein the molded walls comprise fiberglass.

17. The sleeper cab of claim 15, wherein:
   the walls define a window opening; and
   the enclosure includes a window mounted in the window opening.

18. The sleeper cab of claim 1, further comprising a ladder to assist with climbing up to or descending from the enclosure.

19. The sleeper cab of claim 1, wherein the enclosure is configured to be selectively removed from the horizontal neck portion of the gooseneck trailer.

* * * * *